United States Patent [19]

Hotta

[11] Patent Number: 4,552,574
[45] Date of Patent: Nov. 12, 1985

[54] AIR CLEANER

[75] Inventor: Nobuyuki Hotta, Niiza, Japan

[73] Assignee: Kioritz Corporation, Tokyo, Japan

[21] Appl. No.: 596,414

[22] Filed: Apr. 3, 1984

[30] Foreign Application Priority Data

Apr. 18, 1983 [JP] Japan .............................. 58-56678[U]

[51] Int. Cl.$^4$ ............................................. B01D 46/10
[52] U.S. Cl. ....................................... 55/501; 55/503;
55/DIG. 28; 55/DIG. 31; 210/232
[58] Field of Search ................. 55/494, 501, 503, 511,
55/DIG. 28, DIG. 31; 210/232, 238

[56] References Cited

U.S. PATENT DOCUMENTS

| | | | |
|---|---|---|---|
| 1,020,782 | 3/1912 | Tinker | 55/503 |
| 2,035,097 | 3/1936 | Schwartz | 55/501 |
| 3,373,546 | 3/1968 | Setnan | 55/511 |
| 3,747,772 | 7/1973 | Brown | 55/DIG. 31 |

Primary Examiner—David L. Lacey
Attorney, Agent, or Firm—Karl W. Flocks; Sheridan Neimark

[57] ABSTRACT

An air cleaner including a casing, a filter element and a holding plate assembly having a grid-like portion, wherein a plurality of engaging portions are formed at the casing and a plurality of other engaging portions are formed at the holding plate assembly for engagement with each other. One of the engaging portions of the casing is located at one side thereof and the other engaging portion thereof is located at a side thereof opposite the one side, and one of the engaging portions of the holding plate assembly is located at one side thereof and the other engaging portion thereof is located at a side thereof opposite the one side thereof. The engaging portions located at one side of the casing and the holding plate assembly are displaced vertically from the engaging portions located at the other side.

5 Claims, 2 Drawing Figures

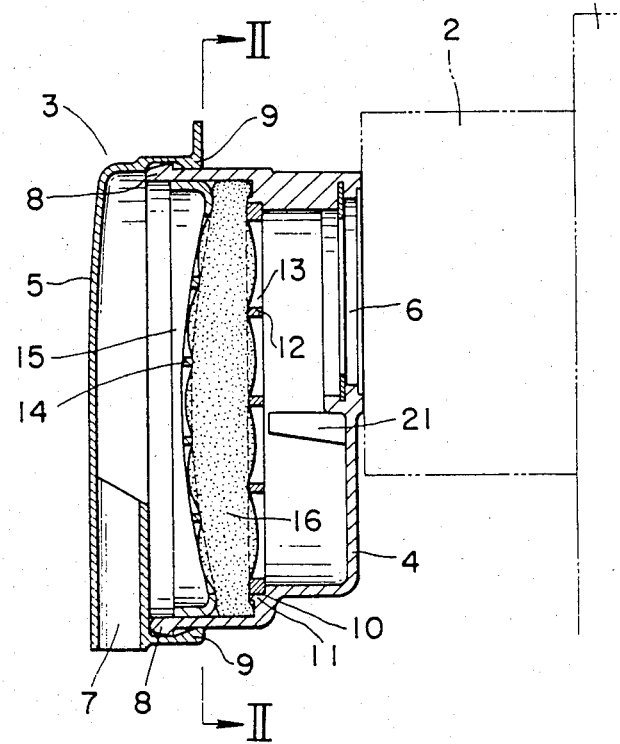
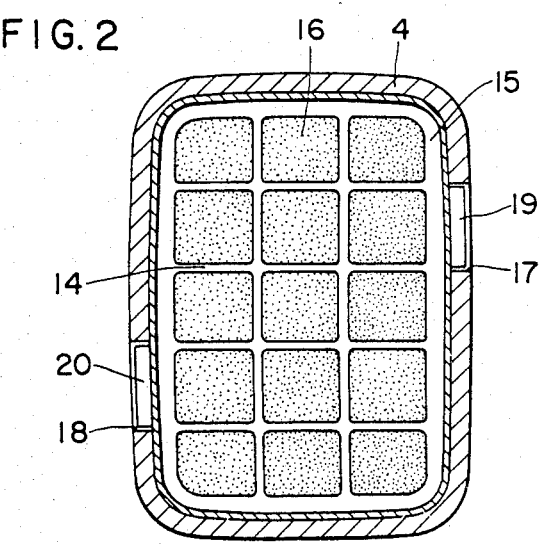

AIR CLEANER

BACKGROUND OF THE INVENTION

This invention relates to an air cleaner suitable for use with an internal combustion engine. It is impossible for an air cleaner of an internal combustion engine to achieve high performance unless its filter element is mounted in a correct position and suitably supported for operation.

For instance, in one type of air cleaner of an internal combustion engine known in the art, a filter element of rectangular shape is used and held in position within a casing by being shaped into a forwardly projecting convex form while being secured at its peripheral edge portion to the casing, to ensure that it achieves high filtering performance while maintaining air permeability at a satisfactory level.

In this type of air cleaner, two holding plate assemblies each consisting of a grid-like portion are used and one holding plate assembly is located in the front of the air cleaner forwardly of the filter element (on the air inlet side) and the other holding plate assembly is located in the rear of the air cleaner rearwardly of the filter element (on the carburettor side), and the grid-like portion of at least one holding plate assembly is bent in convex form so as to extrude forwardly at its middle portion to form and keep the filter element in a forwardly extruding convex form. If the holding plate assembly consisting of a convex-shaped grid-like portion is assembled with the casing of the air cleaner in such a manner that the assembly faces the wrong direction, the filter element would be compressed and brought out of action. Thus, it is necessary that caution be exercised to make the convex-shaped holding plate assembly face the correct direction when it is assembled with the casing.

SUMMARY OF THE INVENTION

This invention has as its object the provision of an air cleaner suitable for use with an internal combustion engine capable of positively avoiding the risk of committing an error by a simple construction when the holding plate assembly is assembled with the casing of the air cleaner.

The outstanding characteristic of the invention enabling the aforesaid object to be accomplished is that novel engaging means is provided to the holding plate assembly and the casing which includes engaging portions located at side edges and vertically spaced apart from each other with respect to a horizontal center line of the casing, so that the holding plate assembly can be positively secured to the casing in a correct position.

By virtue of this outstanding characteristic, the invention enables reassembling to be readily effected after performing maintenance and repair, thereby enabling the filtering performance of the air cleaner to be maintained at a satisfactory level at all times.

BRIEF DESCRIPTION OF THE DRAWINGS

FIG. 1 is a sectional side view of the air cleaner comprising one embodiment of the invention; and FIG. 2 is a sectional view taken along the line II—II in FIG. 1.

DESCRIPTION OF THE PREFERRED EMBODIMENT

FIG. 1 shows an air cleaner 3 according to the invention which is connected to a carburettor 2 of an internal combustion engine 1 and has a filter element 16 of rectangular shape formed of foamed urethane resin, unwoven cloth, etc., which is located substantially in a central portion of the air cleaner 3 further comprising a bowl-shaped casing 4 of rectangular shape having at its bottom portion a duct 6 keeping the air cleaner 3 in communication with the carburettor 2, and a cover member 5 fitted to the casing 4 at its open end. Engaging projections 8 and 9 are provided to an outer periphery of an open end edge of the casing 4 and an inner periphery of an open end edge of the cover member 5 respectively and brought into engagement with each other to secure them together. The cover member 5 has a plurality of suction conduits 7 located at its lower end in parallel relation.

The casing 4 is formed with a seat 10 enclosed by a rib 11 and located in a position slightly spaced apart from the communication duct 6 in an axial direction, and a flat holding plate assembly 13 having a grid-like portion 12 is seated to the seat 10. Then, a filter element 16 and holding plate assembly 15 are inserted from outside in the indicated order. In FIG. 1, the numeral 21 designates a member for preventing deformation of the holding plate 13. The filter element 16 is located substantially in a central portion of the casing 4 while being held at its peripheral edge portion between the holding plate assembly 13 and the holding plate assembly 15.

In the embodiment shown and described hereinabove, the holding plate assembly 15 is formed of polyethylene or other flexible material and having a grid-like portion 14 which is convexed in form and extrudes toward the cover member 5 (outwardly). The grid-like portion 12 of the holding plate assembly 13 may also be convexed in form and extrude toward the communication duct 6.

The holding plate assemblies 14 and 15 are secured to the casing 4 in a position in which the filter element 16 can be held at its peripheral edge portion between an outer periphery of the holding plate assembly 15 and the rib 11 while being slightly pressed thereby. To this end, as shown in FIG. 2, recesses 17 and 18 are formed at right and left side edge portions respectively of the casing 4, and lugs 19 and 20 adapted to engage the recesses 17 and 18 are formed at right and left side edge portions respectively of the holding plate assembly 15. The lugs 19 and 20 are located in positions which are displaced vertically from each other by the same distance with respect to a horizontal center line of the holding plate assembly 15. Thus, although the holding plate assembly 15 can be secured to the casing 4 even if it is placed upside down, it cannot be secured to the casing 4 unless it faces the correct direction.

Thus, it is possible to avoid the risk of compressing the central portion of the filter element by arranging the holding plate assembly 15 in such a manner that the grid-like portion 14 faces the wrong direction or inwardly. The recesses 17 and 18 and lugs 19 and 20 may vary in number and shape from these shown in the figure. Although the recesses 17 and 18 and lugs 19 and 20 have been shown and described, other engaging portions of suitable shape may be used in place of the recesses 17 and 18 and lugs 19 and 20.

What is claimed is:

1. An air cleaner for mounting on a carburetor comprising:
- a bowl-shaped casing having an exit duct for communicating said casing with a carburetor and a set of recess portions and a cover member having conduit means opening into said casing to bring air into said casing;
- a filter element having first and second sides and located in said bowl-shaped casing in the path of air passing between said conduit means and said exit duct for filtering air introduced from outside into said casing;
- a holding means for holding said filter element in place, said holding means supporting the first side of said filter element;
- a holding plate assembly in said casing having a grid-like portion adjacent the second side of said filter element and including a set of engaging lug portions cooperating with said set of engaging recess portions so as to engage said holding plate assembly to said casing,
- one of each of said recess and lug sets of engaging portions located on one side of said holding plate assembly and said casing in adjacent engageable relationship to each other,
- another of each of said recess and lug sets of engaging portions located on a side of said holding plate assembly and said casing, in adjacent engagable relationship to each other, opposite said one side of said holding plate assembly and said casing,
- said one of each of said engaging portions on one side of said holding plate assembly and said casing displaced vertically from said another of each of said engaging portions on the opposite side of said holding plate assembly and said casing.

2. The air cleaner of claim 1, wherein
said set of engaging lug portions are lugs on said holding plate assembly, and
said set of engaging recess portions are recesses in said casing.

3. The air cleaner of claim 1,
wherein said holding means comprises a first grid-like portion in said casing adjacent said first side of said filter element with said filter element held between said grid-like portions of said holding means and said holding plate assembly.

4. The air cleaner of claim 1,
wherein said grid-like portion has a convex shape with a convex face directed toward said cover and a concave face directed toward said filter element.

5. The air cleaner of claim 3,
wherein said grid-like portion of said holding plate assembly has a convex shape with a convex face toward said cover and a concave face directed toward said filter element, and
said first grid-like portion has a flat face on the opposite side of said filter element from said concave face of said grid-like portion of said holding plate assembly.

* * * * *